(No Model.)     E. W. PERRY, Jr.     4 Sheets—Sheet 4.

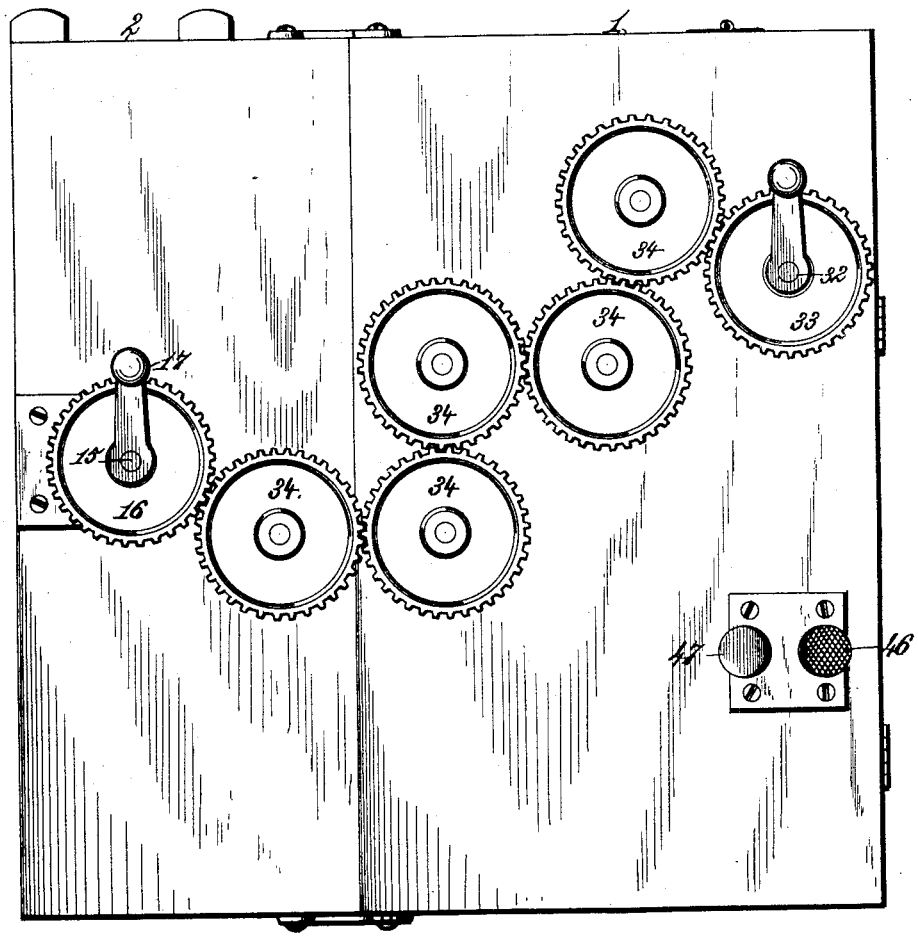

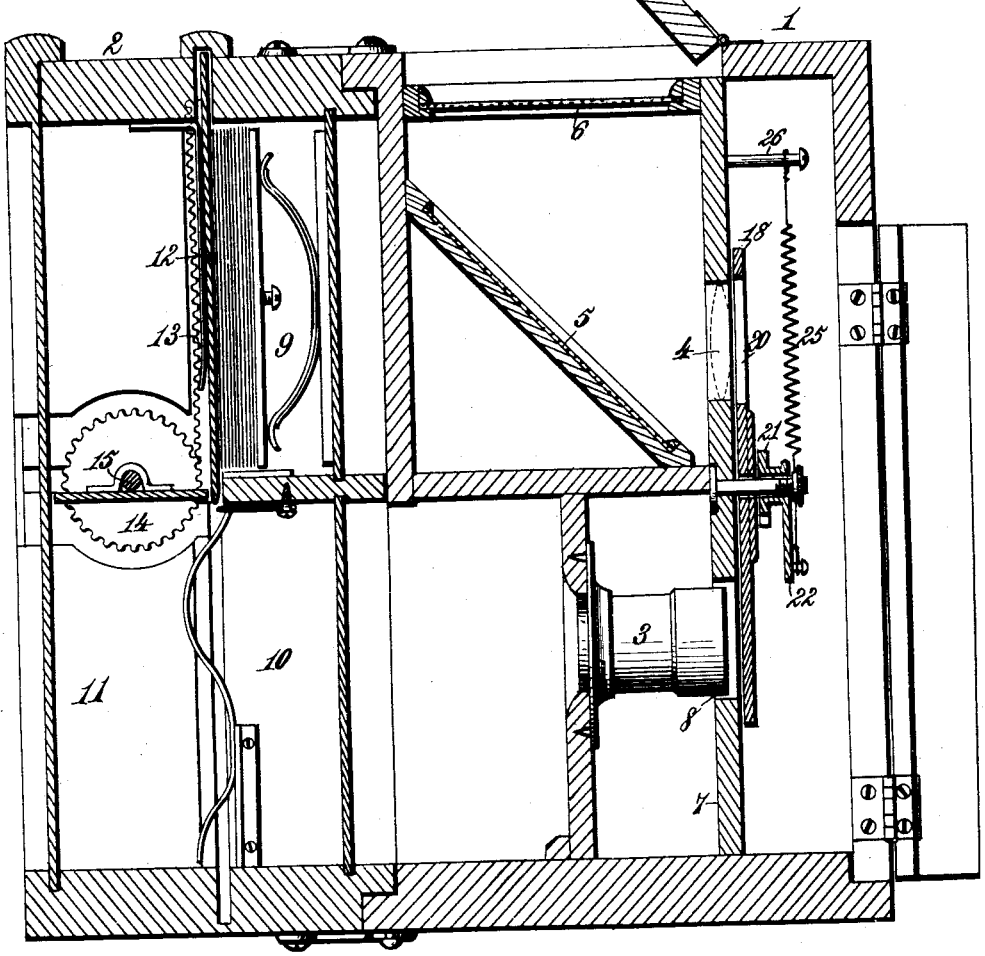

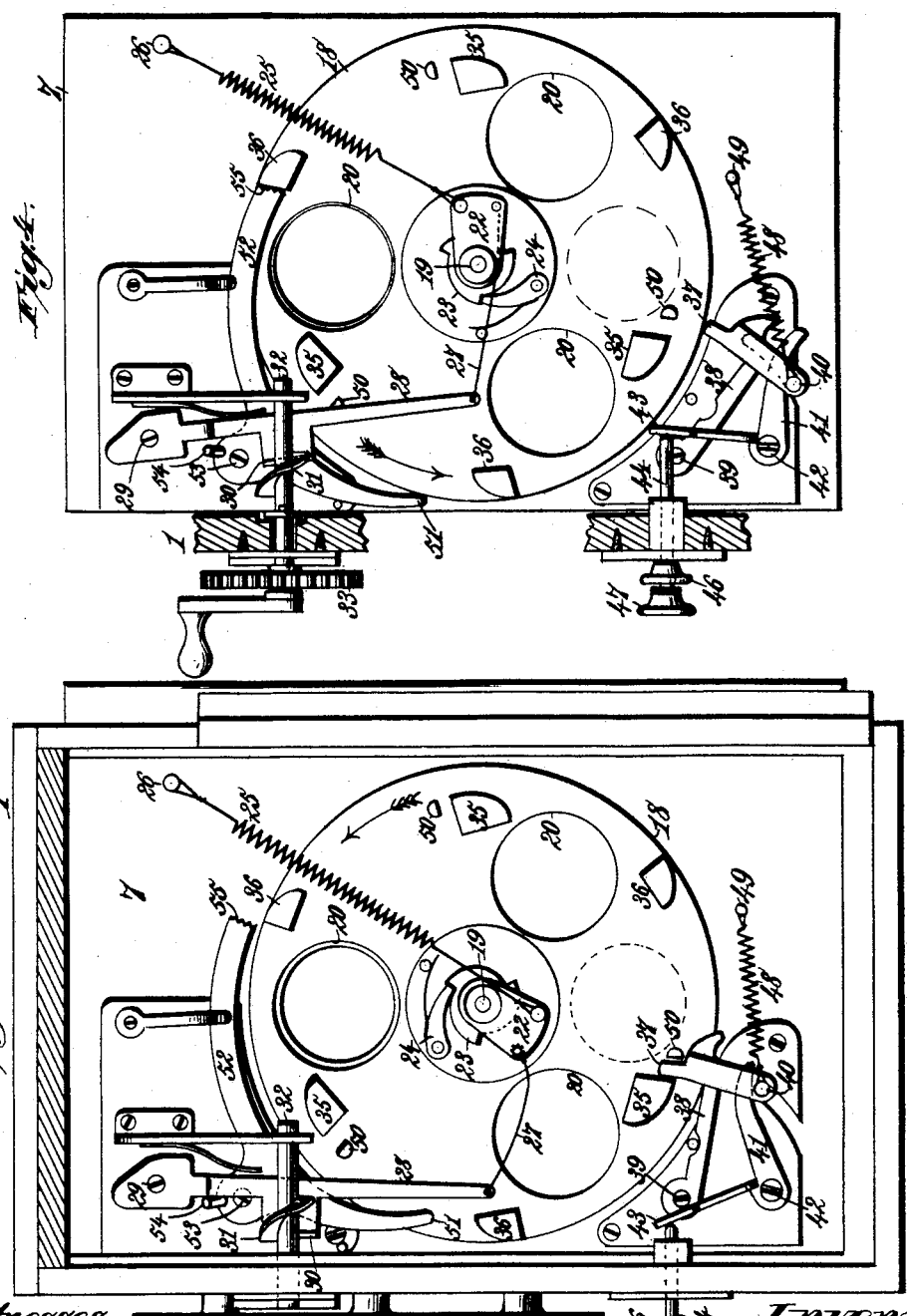

PHOTOGRAPHIC CAMERA.

No. 456,842.     Patented July 28, 1891.

Witnesses:
Robert Everett
A. H. Norris

Inventor:
Enoch Wood Perry Jr.
By James L. Norris
Atty.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

PHOTOGRAPHIC CAMERA.

SPECIFICATION forming part of Letters Patent No. 456,842, dated July 28, 1891.

Application filed July 16, 1890. Serial No. 358,912. (No model.)

*To all whom it may concern:*

Be it known that I, ENOCH WOOD PERRY, Jr., a citizen of the United States, residing at New York, in the county of New York and State of New York, have invented new and useful Improvements in Photographic Cameras, of which the following is a specification.

This invention relates to cameras, whether set or adjustable as regards focusing; and the objects of the invention are to provide a camera wherein the shutter-impelling mechanism is automatically set or energized by the device or mechanism which moves the film, or plate, or web, or other sensitized material into position for exposure, or which removes the plate or film or web after exposure into the receiving portion of the box, according to the kind of plate-holder to be used, thus leaving a fresh film or plate for exposure; to provide a camera wherein two matched lenses are employed, one of which is adapted for focusing and as a finder and the other for taking the picture and both operating in conjunction with a single shutter so constructed and arranged that when one lens is covered the other is uncovered, and to provide novel means whereby a second exposure of the film, or plate, or other sensitized material is rendered impossible, and the operator is not required to depend on memory as regards correct exposures.

To accomplish these objects my invention involves the features of construction, the combination or arrangement of devices, and the principles of operation hereinafter described and claimed, reference being made to the accompanying drawings, in which—

Figure 5:
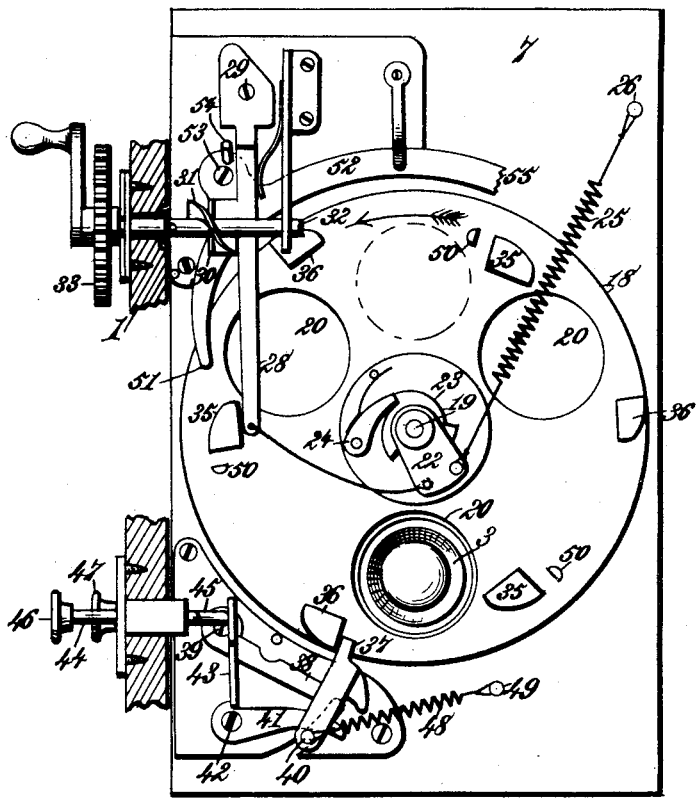
Figure 7:
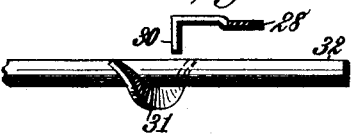
Figure 6:
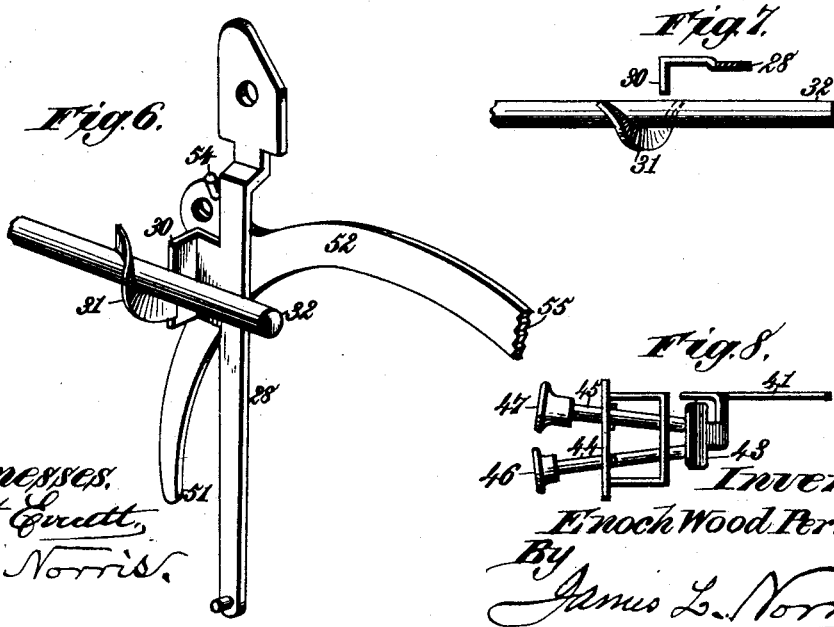
Figure 8:
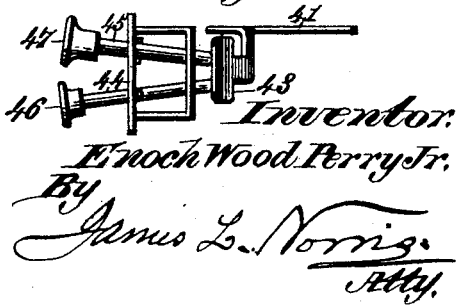

Figure 1 is a side elevation of a camera embodying my invention. Fig. 2 is a vertical central sectional view of the same, with the shutter adjusted to cover the object-lens and uncover the focusing or finding lens. Fig. 3 is a front elevation, partly in section, showing the parts set in position for time or instantaneous exposure. Fig. 4 is a similar view showing the position of the parts when the shutter has been released for instantaneous exposure. Fig. 5 is a similar view showing the position of the parts when the shutter has been released for time exposure. Fig. 6 is a detail perspective view of the worm-gear and the oscillating lever which effect the setting of the shutter-impelling mechanism. Fig. 7 is a detail top plan view of portions of the worm-gear shaft and the oscillating lever co-operating therewith. Fig. 8 is a detail plan view showing the two finger-pieces for effecting time and instantaneous exposures.

In order to enable those skilled in the art to make and use my invention, I will now describe the same in detail, referring to the drawings, wherein—

The numeral 1 indicates a camera-box; 2, a plate-holder permanently or detachably connected with said camera-box; 3, the object-lens; 4, the focusing or finding lens; 5, the mirror, and 6 the ground-glass.

The focusing or finding lens is secured in a partition 7, located in the camera-box and provided with the orifice 8 in alignment with the object-lens.

The plate-holder 2 comprises a magazine 9, exposing-chamber 10, a storage-chamber 11, and a transferring-slide 12, adapted to engage and move a film or plate from the magazine-chamber into the exposing-chamber in alignment or coincident with the object-lens for the purpose of taking the picture. The plate-holder shown is preferably constructed as described and shown in the application filed May 31, 1890, by myself and Emil Kipper, Serial No. 353,691.

I do not deem it essential to more particularly describe the plate-holder, for the one shown is merely typical of a class or kind of plate-holder which can be practically used and the construction and operation of which may be entirely modified and changed without affecting the spirit of my invention, it only being essential to provide some means whereby a film or plate or web of films can be moved or adjusted into alignment or coincidence with the object-lens for the purpose of taking the picture or to withdraw the exposed plate or film from the exposing-compartment, as in the known plate-holders of Kipper and Perry, constructed for that purpose.

If a plate-holder of the type exhibited is employed, I prefer to operate the transferring-slide through the medium of a rack 13, in which meshes a pinion 14, carried by a shaft 15, which is journaled in the casing of the plate-holder and projects therefrom at one side to receive and carry a pinion or gear-wheel 16, Fig. 1. The outer end of the shaft may be provided with a crank or any other suitable handle 17, by which the shaft can be rotated manually to actuate the transferring-slide.

The shutter 18 is journaled on a stud 19, having its bearing in the partition 7, and this shutter is of the rotary type, and is provided with a series of three circular or other suitably-shaped orifices 20. A collar 21, having a lever-arm 22, is journaled on the stud 19 and connects by a pawl and ratchet 23 24 with the shutter in such manner that the shutter can turn in one direction independent of the ratchet which forms a part of the collar 21. The lever-arm 22 of the collar is attached to one end of a spiral or other suitable spring 25, having its other end secured to a stud or pin 26, and such lever-arm is connected by a cord, wire, or other suitable cable or flexible connection 27 with an oscillating lever or arm 28, pivotally supported at its upper end, as at 29, by the partition 7. The oscillating lever is provided with a tooth or projection 30, adapted to engage a worm-gear 31, provided on the horizontal shaft 32, which projects through the side wall of the camera-box, and carries at its outer end a pinion or gear-wheel 33, which is geared by pinions 34 with the pinion or gear wheel 16 on the shaft 15, which operates the film, plate, or other medium which may be employed for obtaining the desired negative.

The object of the connected gear 34 is to automatically rotate the shaft 32 one complete revolution for every complete revolution of the shaft 15, and so long as this object is accomplished the construction of the intermediate gearing or connections 34 is immaterial, for obviously the system of gearing can be widely varied without departing from the spirit of my invention. I simply exhibit a particular set of gearing as typical of one form of mechanism which can be employed for the purpose of rotating the shaft 32 by the rotation of the shaft 15.

The rotary shutter is provided with two sets of stops 35 36, the two sets being arranged or placed in different circular paths in such manner that a stop-dog 37 can be so moved that it will intercept the stops 35 for holding the shutter in set position for its subsequent release to effect either time or instantaneous exposure. The stop-dog 37 is carried by an arm 38, pivoted at 39, and such dog carries at its lower end a pin 40, which bears against the under side of the curved or segmental arm 41, pivoted at 42, and having an upwardly-projecting arm 43, adapted to be operated by either one of two push-pins 44 45, having at their outer ends finger-pieces 46 47. The stop-dog 37 is connected at its lower end with one end of a coiled spring 48, secured at its other end to the stud or pin 49, the construction being such that pressure on the finger-piece 46 will throw the stop-dog 37 the full extent of its stroke, and thereby move it out of the path of all stops 35 36 for instantaneous exposure, while pressure upon the finger-piece 47 will move the stop back a limited distance, but sufficient to place it in the path of the stop-dog 37, and consequently the shutter will be stopped at the proper time with one of its circular openings in coincidence with the object-lens for the purpose of time exposure. The shutter is provided with three pins 50, which are adapted to engage the end of the stop-dog 37 to prevent a back movement of the shutter when being reset. The end 55 of the stop-lever 52, pivoted at 53 to the partition 7, is adapted to engage the stops 36 for stopping the shutter at the proper position after the exposure is completed. This stop-lever is arranged to be moved to permit the rotation of the shutter by means of a pin 54, secured to the lever above its pivot-pin 53, and acted upon by the oscillating lever 28, when the latter is moved outwardly toward the side wall of the camera-box, as hereinafter explained, thereby swinging the stop-lever on its pivot 53 and lifting its acting end 55 out of the path of the stops 36.

The mechanism described with reference to the finger-pieces and means for effecting time and instantaneous exposures is substantially the same as that described and claimed in my applications for Letters Patent, filed May 31, 1890, and June 7, 1890, Serial Nos. 353,751 and 354,646, and therefore I do not deem it essential to enter into a detailed explanation of the *modus operandi* of the stops, the stop-dog, and the finger-pieces, whereby the shutter is released for the action of its propelling mechanism to rotate the shutter the required distance for time or instantaneous exposures.

In practice the rotation of the shaft 15 to place a film, plate, or other negative medium into alignment or coincidence with the object-lens or to withdraw the same after exposure from the front of the object-lens into a receiving-chamber operates to rotate the shaft 32 and thereby cause the worm-gear 31 to act on the tooth 30 of the oscillating lever 38 and swing the latter outwardly toward the side of the camera-box, by which movement the flexible connection 27 is tightly drawn and the lever-arm 22 is swung in the direction required to place the spring 25 under the tension required for the prompt rotation of the shutter when the latter is released for time or instantaneous exposures.

It will be obvious that the spring constitutes the essential element of the shutter-impelling mechanism; but inasmuch as other impelling mechanisms are known in cameras for the purpose of operating shutters, I do not confine myself to the particular impelling mechanism which I have chosen to exhibit in the drawings.

A complete revolution of the shaft 15 imparts a complete revolution to the shaft 32, which effects the set of the shutter-impelling mechanism, and when this is accomplished the shutter is locked and held stationary by the stop-dog 37 engaging one of the stops 35, while the worm-gear will be in the position indicated in Fig. 3, in which position such worm-gear is practically out of engagement with the tooth 30 of the oscillating lever 28, in consequence of which when the shutter is released from engagement with the stop-dog 37 the worm-gear offers no obstruction to the free swinging movement of the lever 28 toward the axis of the shutter, which movement is effected by the action of the shutter-impelling mechanism or spring 25. In the movement of the oscillating lever outwardly toward the side of the camera-box such lever acts on the pin 54, and thereby lifts the acting end 55 of the stop-lever 52 out of engagement with one of the stops 36, as shown in Fig. 3, whereby the shutter is set for its release to effect instantaneous or time exposures by movement of the finger-pieces 46 or 47.

By the means described it will be obvious that the shutter-impelling mechanism is automatically set or energized in unison with the movement of the film, plate, or other negative medium into alignment or coincidence with the object-lens for time or instantaneous exposures, or in unison with the withdrawal of said plate or film or web into the receiving portion of the holder occupied by the exposed films or plates or sections of the web; but inasmuch as the gist of my invention resides in setting or energizing the shutter-impelling mechanism by the movement of the film-adjusting device or contrivance, I do not confine myself to the exact connecting mechanism described and shown between the shaft 15 and the shutter, for other mechanisms will suggest themselves to those skilled in the art.

I have shown my invention applied to a camera having a universal or set focus; but I do not confine myself thereto, for obviously the object-lens and the focusing or finding lens may be made adjustable by any suitable device, such, for example, as the rack-and-pinion mechanism exhibited in my application, Serial No. 354,646, above alluded to.

By the arrangement of circular or other suitably-shaped orifices 20 in the shutter and the stops 35 and 36 in conjunction with suitable devices for releasing the shutter for time or instantaneous exposures, the object-lens is covered when the focusing or finding lens is uncovered, and vice versa.

After an exposure has been completed the oscillating lever cannot be moved to the side of the camera by any further advance movement of the wheel 33 until the same wheel 33 has made a full retrograde revolution in unison with a full retrograde revolution of wheel 16, which returns the toothed frame into the storage-chamber 9 for a fresh plate, the last exposed plate having been pushed into receiving-chamber 11, or which removes the exposed plate or film from the exposure-chamber into the receiving-chamber. Then the former movement is repeated, which sets the shutter and moves a fresh film or plate or portion of a web into position for exposure or returns the now empty frame into the exposure-chamber in readiness to remove the new exposed plate or film. Therefore by the mechanism as herein described a second exposure of the same plate is made impossible, as the shutter cannot be reset until the exposed plate has been removed and the frame returned to the storage-chamber 9.

If my invention is applied to a camera wherein a web or continuous film is employed, no backward movement is required, because the web or continuous film moves in one direction, so that the sections of the film follow one another. Consequently in such cameras a single movement is only necessary— i. e., the movement which resets the shutter and moves a fresh portion of the web into position.

Having thus described my invention, what I claim is—

1. The combination, in a camera, of a movable shutter, a film or plate holder having mechanism for adjusting the film or plate into alignment with the object-lens, with a gear connecting the film or plate adjusting mechanism with the shutter for setting the latter, substantially as described.

2. The combination, in a camera, of a movable shutter, a lever-arm having a pawl-and-ratchet connection with the shutter-impelling mechanism, a shutter-impelling mechanism connected with said lever-arm, an oscillating lever also connected with the lever-arm, a shaft having a gear connection with the oscillating lever, and a film or plate holder having a film or plate adjusting mechanism connected with said shaft, substantially as described.

3. The combination, in a camera, of a movable shutter, a shutter-impelling mechanism, an oscillating lever having a flexible connection with the shutter-impelling mechanism, a shaft having a gear connection with the oscillating lever, and a film or plate holder having a film or plate adjusting mechanism connected with such shaft, substantially as described.

4. The combination, in a camera, of a movable shutter having stops, a shutter-impelling mechanism, a stop-lever adapted to engage said stops after the shutter-impelling mechanism has completed the movement of the shutter, an oscillating lever having a flexible connection with the shutter-impelling mechanism and serving to move the stop-lever out of engagement with said shutter-stops, a shaft having a gear connection with the oscillating lever, and a film or plate holder having a film or plate adjusting mechanism connected with said shaft for oscillating the lever, substantially as described.

5. The combination, in a camera having matched object and focusing or finding lenses, a mirror, and a ground glass, of a movable shutter having a series of orifices whose relative construction and arrangement are such that when the object-lens is covered by said shutter the focusing or finding lens is uncovered, substantially as described.

In testimony whereof I have affixed my signature in presence of two witnesses.

ENOCH WOOD PERRY, Jr.

Witnesses:
J. H. CARMIENCKE,
W. J. DUNCAN.